(12) United States Patent
Abotabl et al.

(10) Patent No.: US 12,477,464 B2
(45) Date of Patent: Nov. 18, 2025

(54) WAKE-UP SIGNAL INDICATION OF MONITORING OCCASION DISTRIBUTION

(71) Applicant: QUALCOMM Incorporated, San Diego, CA (US)

(72) Inventors: Ahmed Attia Abotabl, San Diego, CA (US); Marwen Zorgui, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 18/047,220

(22) Filed: Oct. 17, 2022

(65) Prior Publication Data

US 2024/0129853 A1   Apr. 18, 2024

(51) Int. Cl.
*H04W 52/02* (2009.01)
*H04W 76/28* (2018.01)

(52) U.S. Cl.
CPC ....... *H04W 52/0229* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 2020/0213943 A1* | 7/2020 | Medles | H04W 52/0216 |
| 2022/0039008 A1* | 2/2022 | Nimbalker | H04W 52/02 |
| 2022/0132425 A1* | 4/2022 | Seo | H04W 52/02 |
| 2022/0174598 A1* | 6/2022 | Seo | H04W 68/02 |
| 2022/0174651 A1* | 6/2022 | Seo | H04W 76/28 |
| 2023/0119379 A1* | 4/2023 | Kim | H04W 72/23 370/311 |

* cited by examiner

*Primary Examiner* — Jamaal Henson
(74) *Attorney, Agent, or Firm* — Patterson+ Sheridan, L.L.P.

(57) ABSTRACT

Certain aspects of the present disclosure provide a method of wireless communication at a user equipment (UE), generally including obtaining a signal indicating the UE should be awake for an upcoming discontinuous reception (DRX) ON duration; and monitoring for downlink control information (DCI) in the DRX ON duration, according to an indication in the signal of at least one periodicity of DCI monitoring occasions (MOs) for the DRX ON duration.

29 Claims, 17 Drawing Sheets

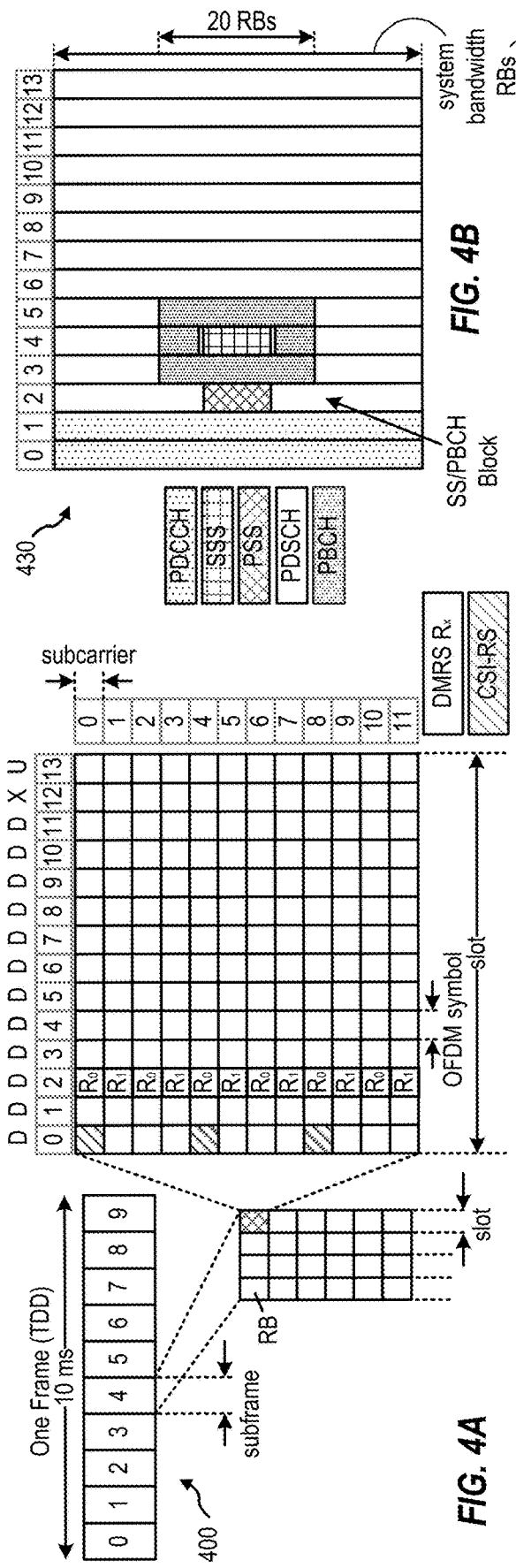
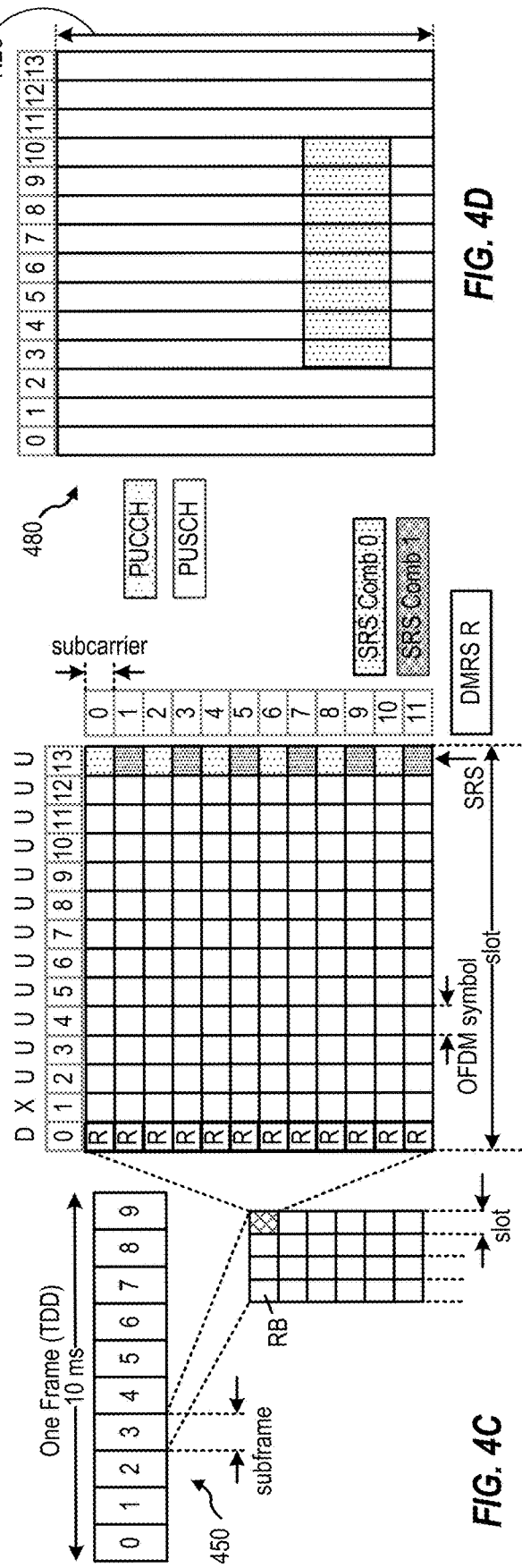

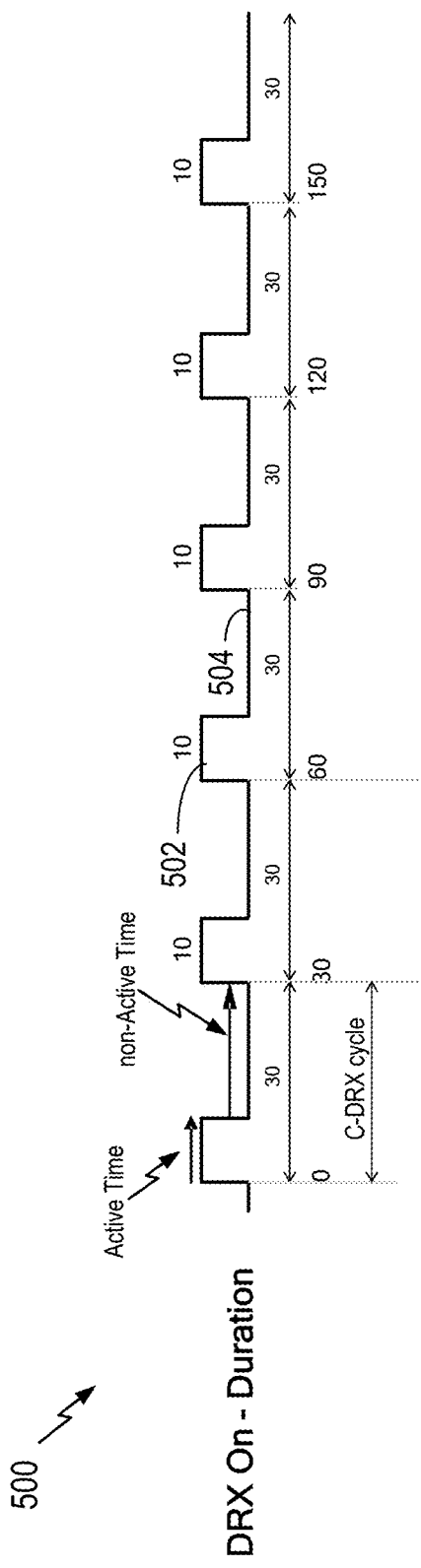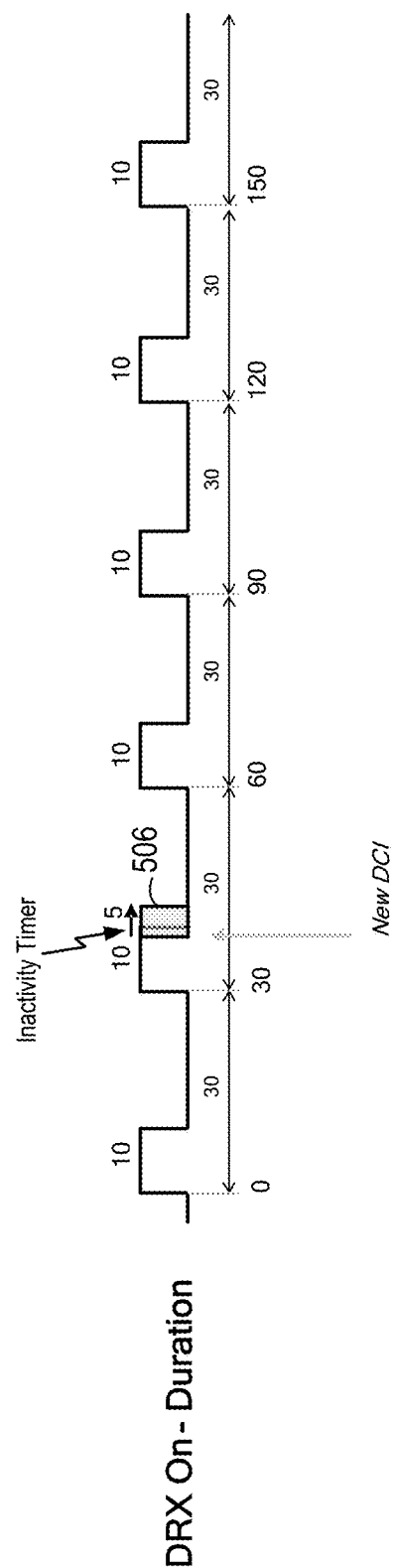
FIG. 5A
FIG. 5B

WAKE-UP SIGNAL INDICATION OF MONITORING OCCASION DISTRIBUTION

BACKGROUND

Field of the Disclosure

Aspects of the present disclosure relate to wireless communications, and more particularly, to techniques for indicating the location of monitoring occasions via a wake up signal (WUS).

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communication at a user equipment (UE). The method includes obtaining a signal indicating the UE should be awake for an upcoming discontinuous reception (DRX) ON duration; and monitoring for downlink control information (DCI) in the DRX ON duration, according to an indication in the signal of at least one periodicity of DCI monitoring occasions (MOs) for the DRX ON duration.

Another aspect provides a method of wireless communication at a network entity. The method includes outputting for transmission a signal indicating a UE should be awake for an upcoming DRX ON duration, wherein the signal also indicates at least one periodicity of DCI MOs for the DRX ON duration; and outputting, for transmission, a DCI in at least one of the DCI MOs.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIG. 5A and FIG. 5B depict example connected-mode discontinuous reception (CDRX) timelines.

DETAILED DESCRIPTION

Figure 1:
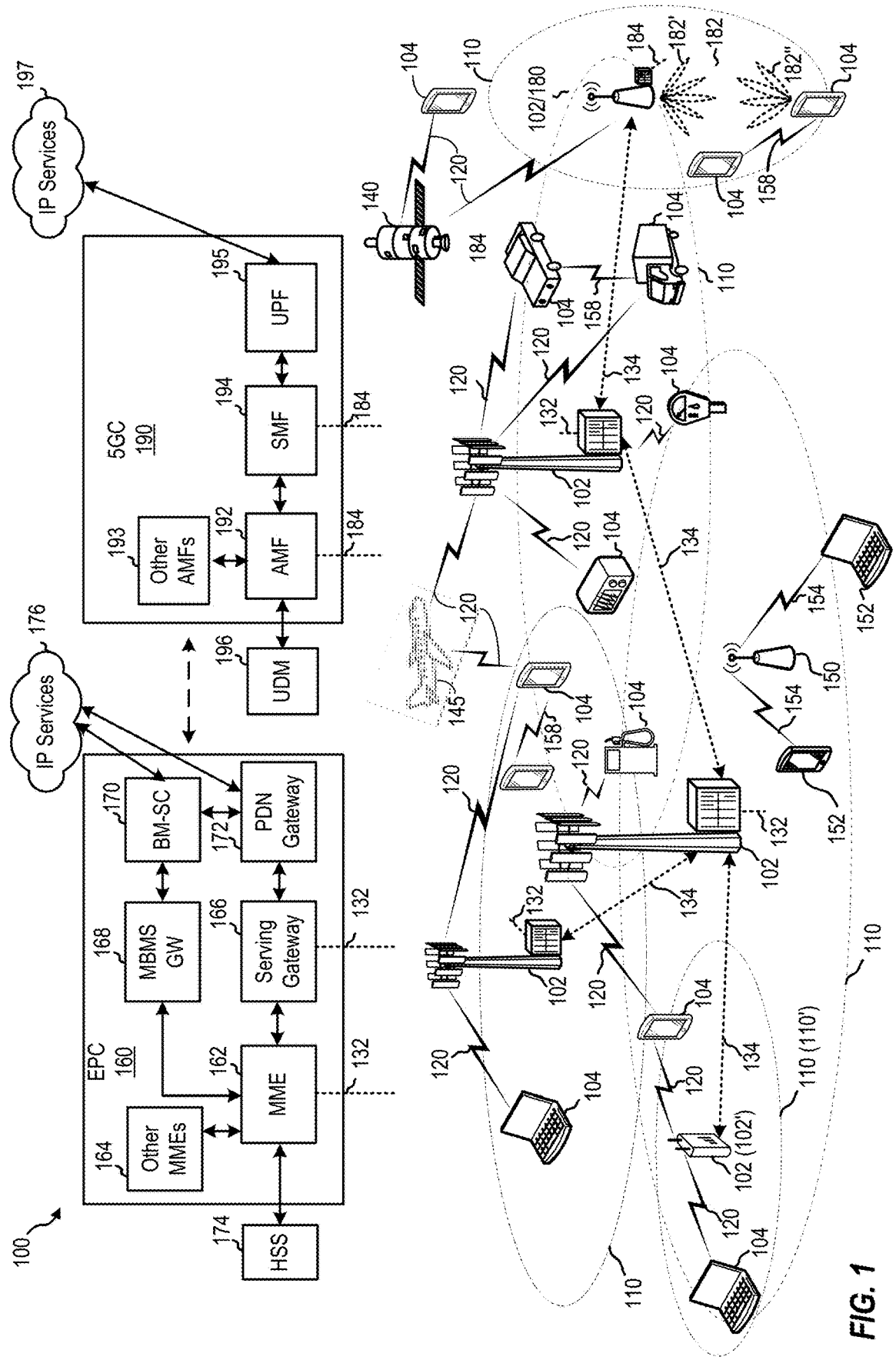
FIG. 1 depicts an example wireless communications network.

Aspects of the present disclosure provide apparatuses, methods, processing systems, and computer-readable mediums for indicating the location of monitoring occasions via a wake up signal (WUS).

Various wireless devices, such as Internet of Things (IoT) and wearable devices have limited power sources. For example, smart glasses used for extended reality (XR) applications typically have small batteries (~200 mAhr typically) owing to their small form factor. As used herein, the term XR generally encompasses various technologies, such as augmented reality (AR) and virtual reality (VR). Because adding a bigger battery in XR wearables is often impractical, power saving is typically considered as an important area for XR designs.

One mechanism for conserving power is to place a device, such as a user equipment (UE) participating in XR communications, in a connected discontinuous reception (CDRX) mode. In CDRX mode, a UE may stay in a low power state, except during a CDRX Active time (or On-Duration), when the UE monitors for downlink data, sends uplink data, or takes channel measurements. In some cases, a wakeup signal (WUS) may be used to indicate whether the UE needs to wake up for a subsequent On-Duration. A UE may be configured to monitor for a WUS, within a WUS monitoring window. If a WUS is detected, the UE may wake up to monitor for data transmissions. Otherwise, if no WUS is detected, the UE may return (or stay in) a low power state (e.g., until a subsequent WUS monitoring occasion). If a WUS indicates the UE should wake up, it may exit the low power state to monitor for downlink control information (DCI) scheduling data transmissions in a subsequent On duration.

In some applications, data arrival may be accurately expected. Other application, however, suffer from jitter that makes the data arrival follow a distribution where some data arrives early and some later. This jitter presents challenges to efficient data deliver within a CDRX on duration. In addition, the amount of data to be received by a UE (which may also be modeled according to certain distribution) impacts the number of DCIs that can be received by the UE. This information can be predicted over time by the network side and, in an effort to improve the UE power efficiency, DCI monitoring occasions (MOs) may be adapted accordingly.

Unfortunately, this approach has challenges that may result in less than optimal performance. For example, when the UE receives a WUS indication, it may begin to monitor for DCIs in the On duration, but the data arrival may change from one cycle to another. If there are too many DCI MOs than necessary for a given burst of data, the UE may waste power monitoring unnecessarily in a given On duration. If there are too few DCI MOs, the data rate may suffer.

Aspects of the present disclosure provide a mechanism to dynamically signal an indication of a distribution of DCI MOs in an upcoming On duration. For example, a WUS may convey an indication of a periodicity in the corresponding DRX On duration. In some cases, the WUS may indicate an irregular periodicity that follows a distribution by sub-sampling the frequently configured MOs in different time intervals (partitions of the On duration).

Aspects of the present disclosure allow DCI MO distribution to be adapted to fit data arrival priority. As a result, the techniques proposed herein may result in increased UE power savings while maintaining data rate.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
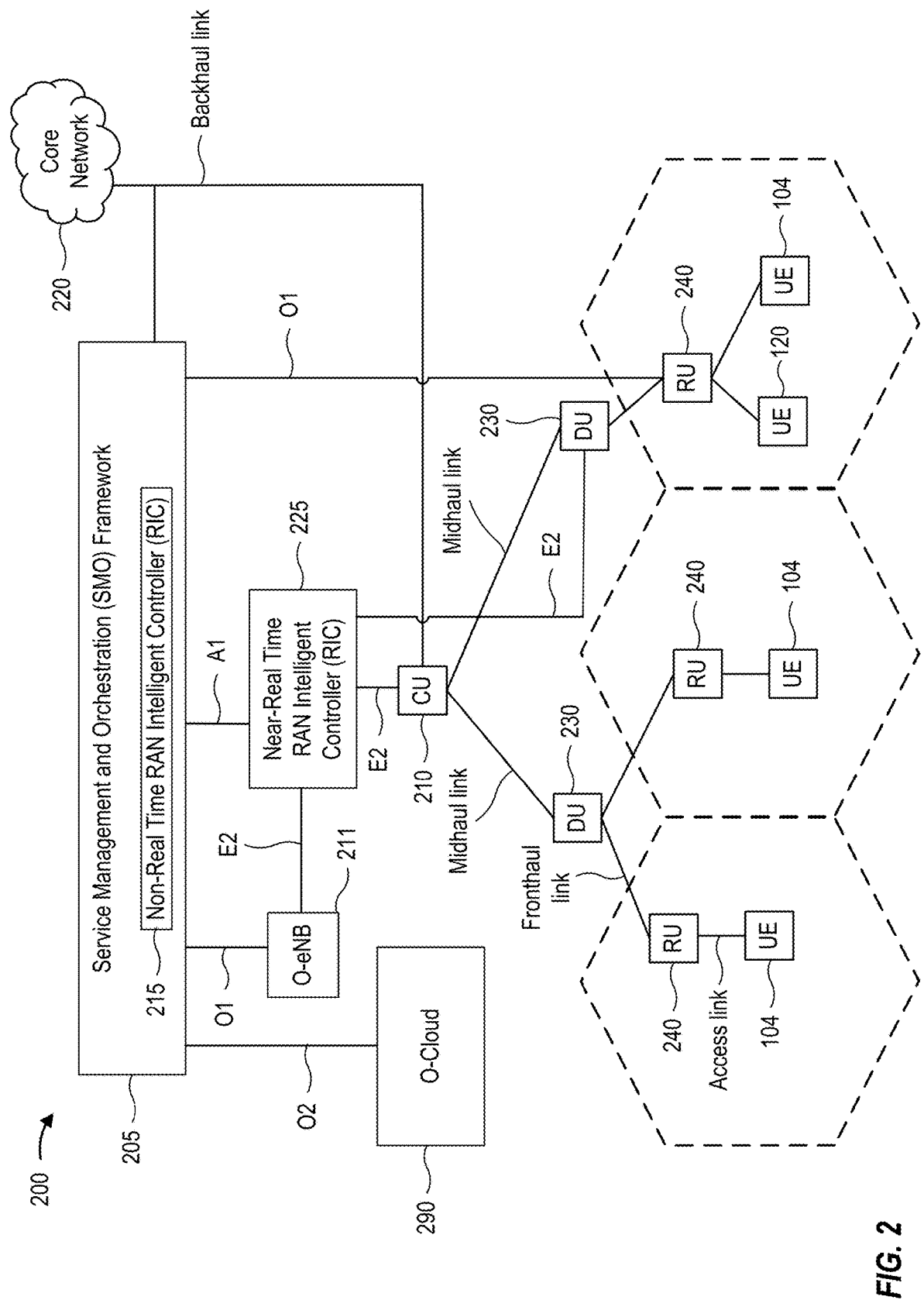
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
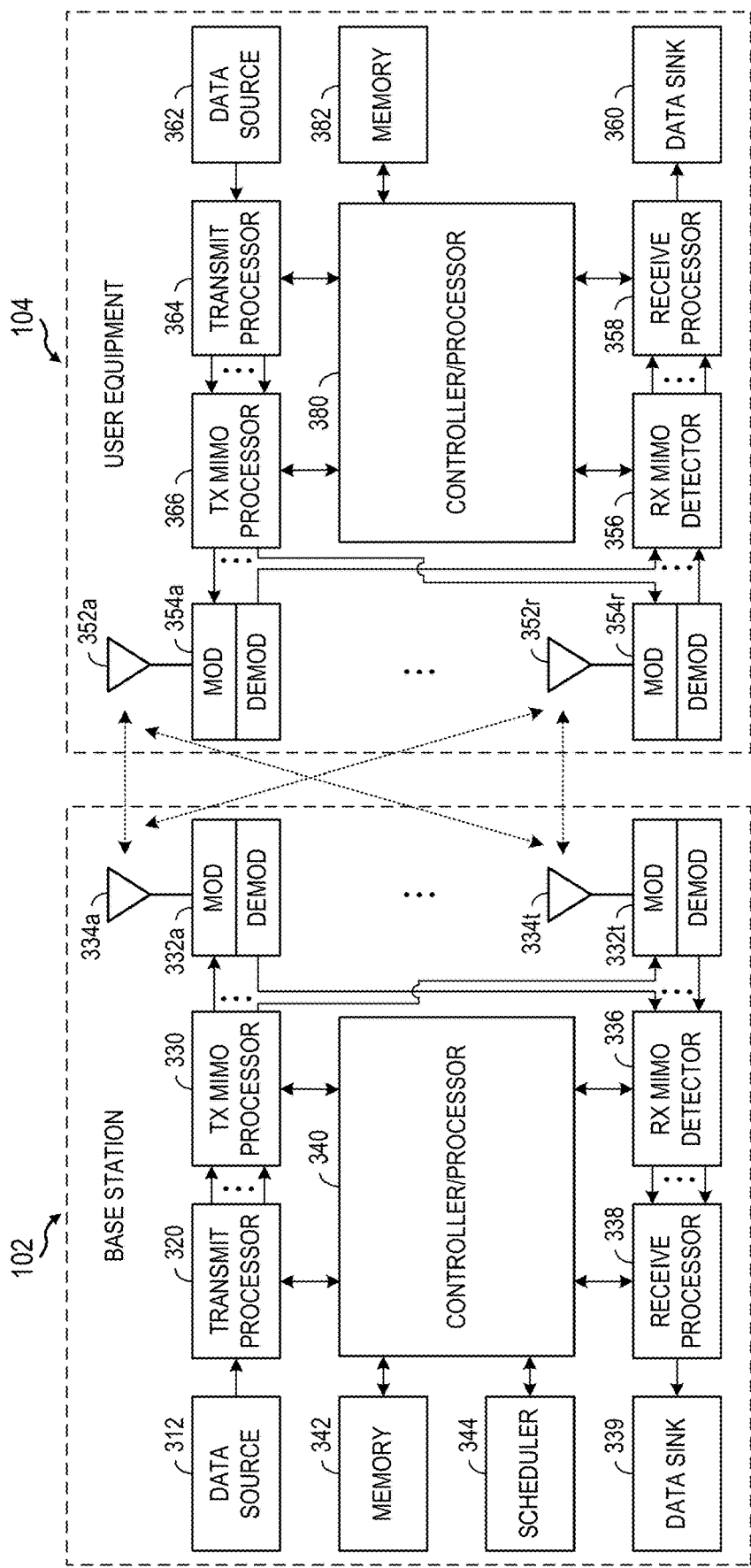
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (µ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^\mu \times 15$ kHz, where 1.1, is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Discontinuous Reception

To reduce power consumption, a user equipment (UE) may be configured for discontinuous reception (DRX)

operations. As illustrated in the timing diagram 500 of FIG. 5A, during a connected DRX mode (CDRX), UE duration can be broadly divided into "Active time" durations 502 and "non-Active" time durations 504.

During a CDRX Active time (or On-Duration), the UE monitors for physical downlink shared channel (PDSCH) activity continuously or with a given periodicity, receives downlink data, transmits UL data, and/or makes serving cell measurements or neighbor measurements. During Active time, a UE is generally considered "on" while various timers are running. For example, an Active duration timer (e.g., drx-onDurationTimer), an inactivity timer (drx-Inactivity-Timer), and a complete DRX cycle duration (e.g., drx-ShortCycle) may run during an Active time. The beginning of a DRX cycle may be defined by a starting offset value.

In the examples shown in FIGS. 5A and 5B, the active time is 10 ms and the CDRX cycle duration is 30 ms. As illustrated the timing diagram 510 of FIG. 5B, the UE may be configured with an inactivity timer (starting an inactivity period 506) that restarts when activity is detected and expires after 5 ms without detected activity. When the inactivity timer expires, the UE enters an "inactive" or "sleep" mode.

In some cases, a UE may be configured with an enhanced CDRX (eCDRX) mode to mitigate drift in latency resulting from misalignment with traffic burst arrivals. Current CDRX mode is configured for integer value periodicity, while typical multimedia data traffic update rates (e.g., 60 Hz, 90 Hz, 45 Hz, 120 Hz, or 48 Hz) often lead to non-integer value periodicity.

Overview of Wake Up Signal Indications

Figure 6:
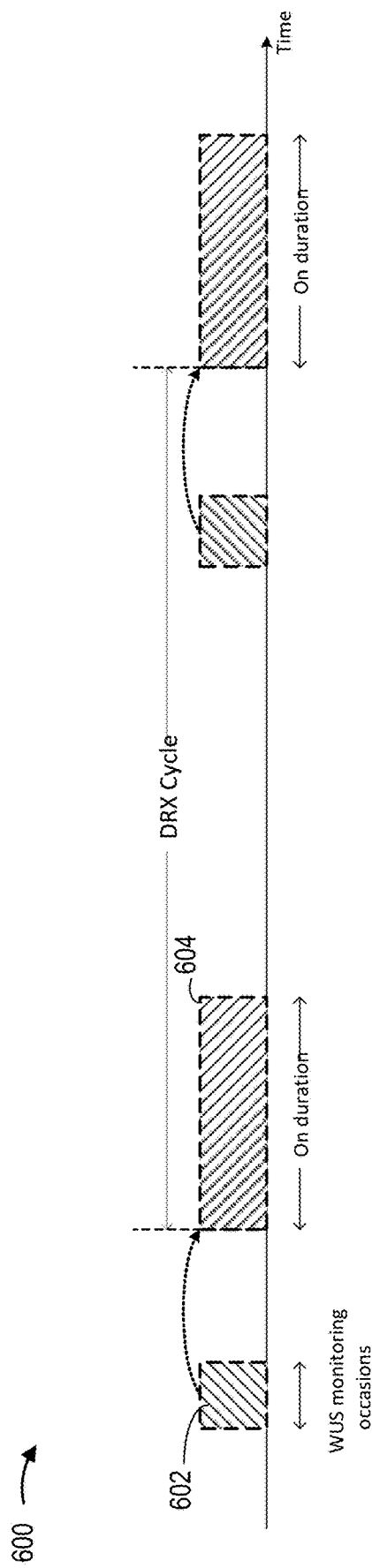
FIG. 6 depict wake-up signal (WUS) monitoring occasions (MOs) associated with a DRX cycle.

As noted above, a UE configured for DRX mode operation may be configured to monitor for a WUS outside of the DRX Active Time (On duration). As illustrated in the timeline 600 of FIG. 6, a set of WUS monitoring occasions 602 are associated with each DRX cycle. The WUS indicates whether the UE's MAC entity should start the drx-onDurationTimer for an On duration 604 for the next DRX cycle. The WUS does not impact other timers (e.g., bwp-inactivity Timer, dataInactivityTimer, and sCellDeactivationTimer).

Figure 7:
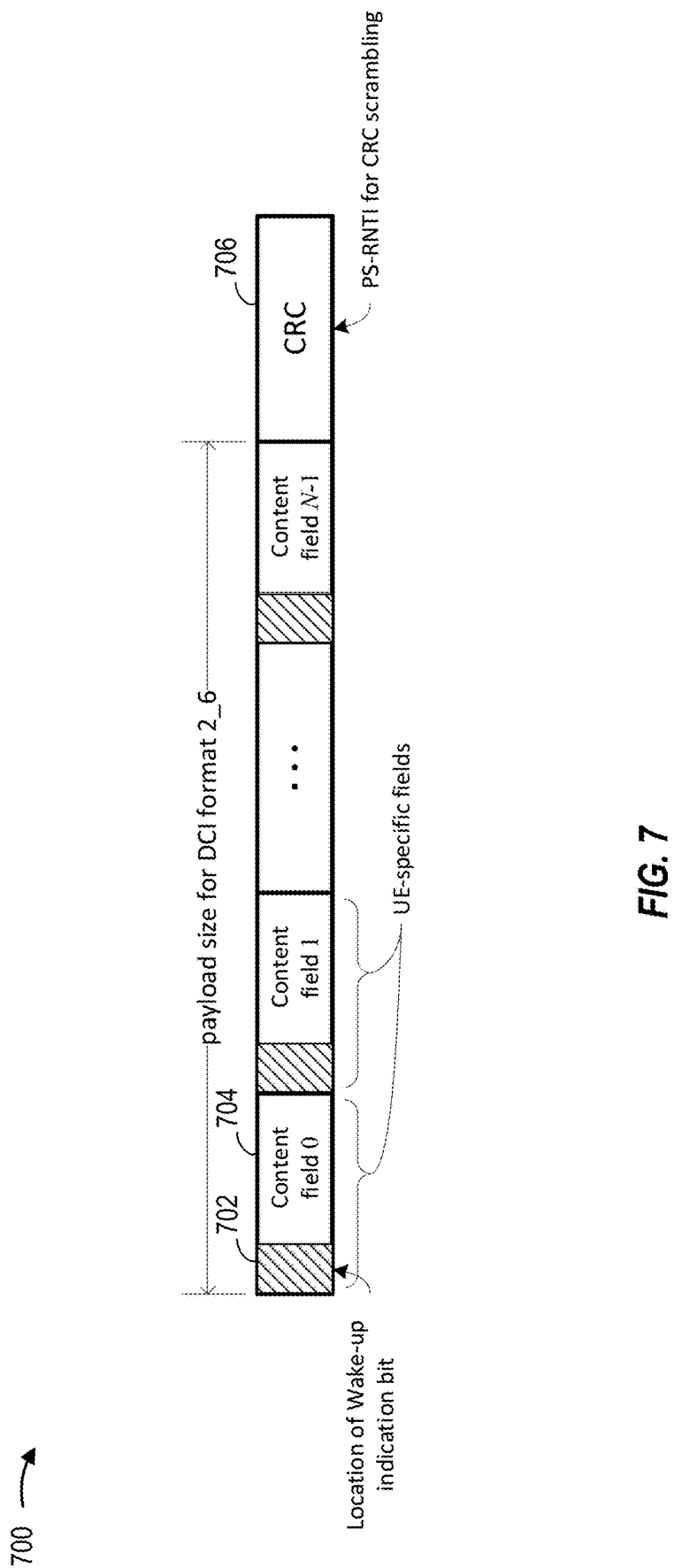
FIG. 7 depicts an example configuration of a WUS.

As illustrated in FIG. 7, a WUS may be conveyed via a PDCCH 700 defined by a certain DCI format (e.g., DCI format 2_6) with CRC 706 scrambled by a power saving radio network temporary identifier (PS-RNTI). A WUS may be shared by a group of UEs and may be monitored in common search space sets (CSS). A WUS can be configured only on a primary cell (PCell) or primary secondary cell (PSCell). A WUS can indicate the dormancy behavior for (up to 5) SCell groups.

More than one search space set may be configured for a WUS DCI format. Associated control resource sets (CORE-SETs) with the search space sets can have different transmission configuration indicator (TCI) states (e.g., for WUS beam sweeping in FR2).

Figure 8:
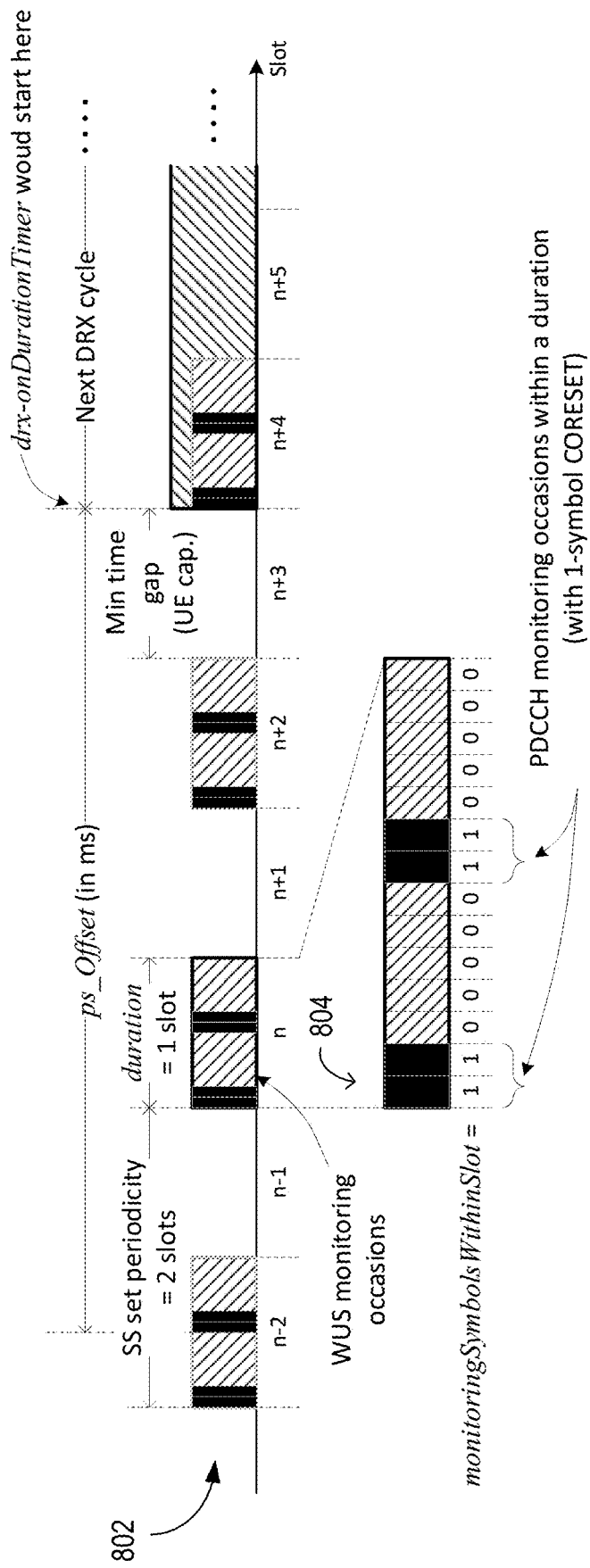
FIG. 8 depicts a diagram showing example details of WUS MO locations.

FIG. 7 illustrates an example payload size of the WUS DCI format and location of a wake-up indication bit 702 for indicating a position of UE-specific fields. A WUS PDCCH (e.g., DCI format 2_6) can be shared by a group of UEs, where each UE in the group can be assigned with a UE-specific field 704 in the DCI. SCell groups (e.g., up to 5) may be configured for dormancy behavior indication outside active time. SCell groups for dormancy behavior indication during active time (e.g., by scheduling DCI) may be configured separately As illustrated in FIG. 8, a time offset (ps_Offset) from a PDCCH monitoring occasions 804 within a WUS monitoring occasion 802 may indicate a time that the UE starts locating monitoring occasions for DCI format 2_6 prior to a slot where a DRX cycle starts ps_Offset ε {0.125 ms, 0.25 ms, 0.375 ms, . . . , 15 ms}.

For each search space set configured for monitoring a WUS DCI format, the UE monitors PDCCH occasions in the first duration starting at or after ps_Offset and ending before slot that the drx-onDurationTimer would start. As shown in FIG. 8, a "minimum time gap" may be defined as the time duration before the slot that the drx-onDurationTimer would start, within which the UE is not required to monitor DCI format 2_6. The minimum time gap is determined based on UE capability and in unit of slots and is typically subcarrier space (SCS) dependent. For each SCS supported by a UE, the UE may report a value from two candidate values (e.g., with a maximum of 3 ms).

If a UE detects a DCI format (e.g., format 2_6) in at least one MO, the UE may follow the indication in the UE-specific field in the DCI. If the UE monitored WUS MOs without detecting a certain DCI format (e.g., in a discontinuous transmission-DTX-from a gNB or misdetection at a UE), a higher layer parameter (ps-WakeupOrNot) may indicate whether or not the UE is to start a drx-onDurationTimer for the next DRX cycle. If ps-WakeupOrNot is not provided, the UE may not start drx-onDurationTimer for the next DRX cycle.

If a UE is configured with both short and long DRX cycles, the UE may monitor for DCI format only for Long DRX cycles. For DRX Short cycles, the drx-onDurationTimer may always be started for DRX Short cycles. The UE may not be required to monitor for DCI format during the DRX Active Time. The UE may always start drx-onDurationTimer for the next DRX cycle if any one of certain conditions are met. These conditions may include the current active BWP is not configured to monitor for DCI format 2_6, the UE is not required to monitor PDCCH for detection of DCI format 2_6 (e.g., due to overlap with SSBs, other PDCCH occasions with different QCL-TypeD properties, measurement gap, BWP switching delay, etc.) for all WUS MOs, or there are no WUS monitoring occasions for a DRX cycle.

Aspects Related to WUS Indication of Monitoring Occasion Distribution

Figure 9A:
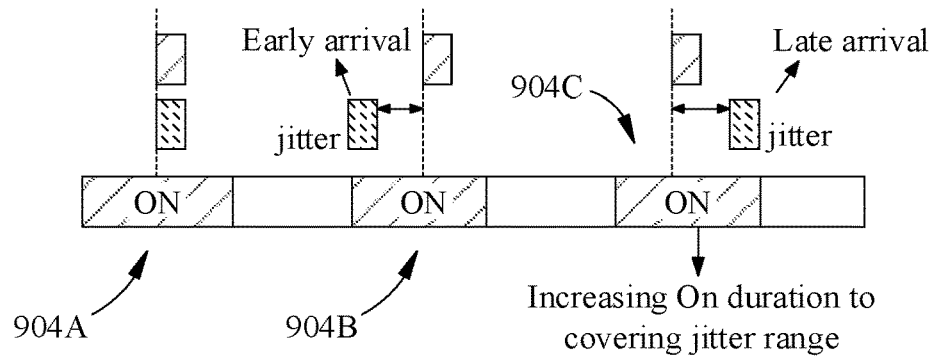
FIG. 9A and FIG. 9B depict example jitter and an example graph of a probability density function.
Figure 9B:
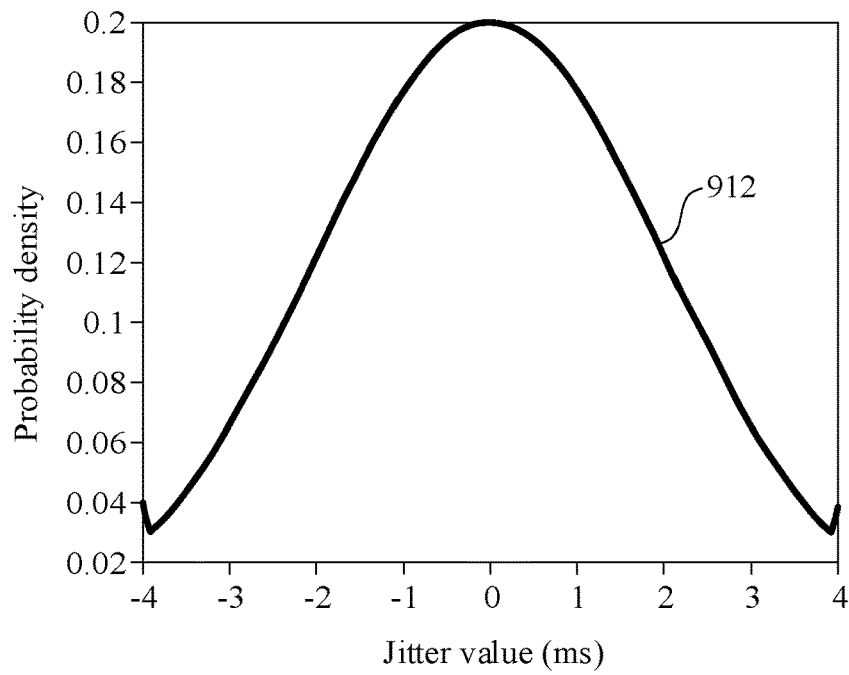

As noted above, some applications suffer from jitter that presents challenges to efficiently deliver data within a CDRX on duration. As illustrated in the timing diagram 900 of FIG. 9A, while data may sometimes occur when expected (as shown in On duration 904A), jitter may cause some data to arrive early (as shown in On duration 904B) and some later than expected (as shown in On duration 904C). As illustrated by curve 912 in the probability density function (PDF) graph 910 of FIG. 9B, the data arrival may follow a normal distribution that might come a little early or a little later (e.g., within a range of +/−4 ms).

This jitter presents challenges to efficient data deliver within a CDRX on duration. In addition, the amount of data to be received by a UE (which may also be modeled according to certain distribution) impacts the number of DCIs that can be received by the UE. This information can be predicted over time by the network side and, in an effort to improve the UE power efficiency, DCI monitoring occasions (MOs) may be adapted accordingly. Unfortunately, the data arrival may change from one cycle to another, which may mean configured DCI MOs may be less than optimal.

Aspects of the present disclosure provide a mechanism to dynamically signal an indication of a distribution of DCI MOs in an upcoming On duration. For example, a WUS may convey an indication of a periodicity in the corresponding DRX On duration. In some cases, the WUS may indicate an irregular periodicity that follows a distribution by sub-sampling the frequently configured MOs in different time intervals (partitions of the On duration).

Figure 10:
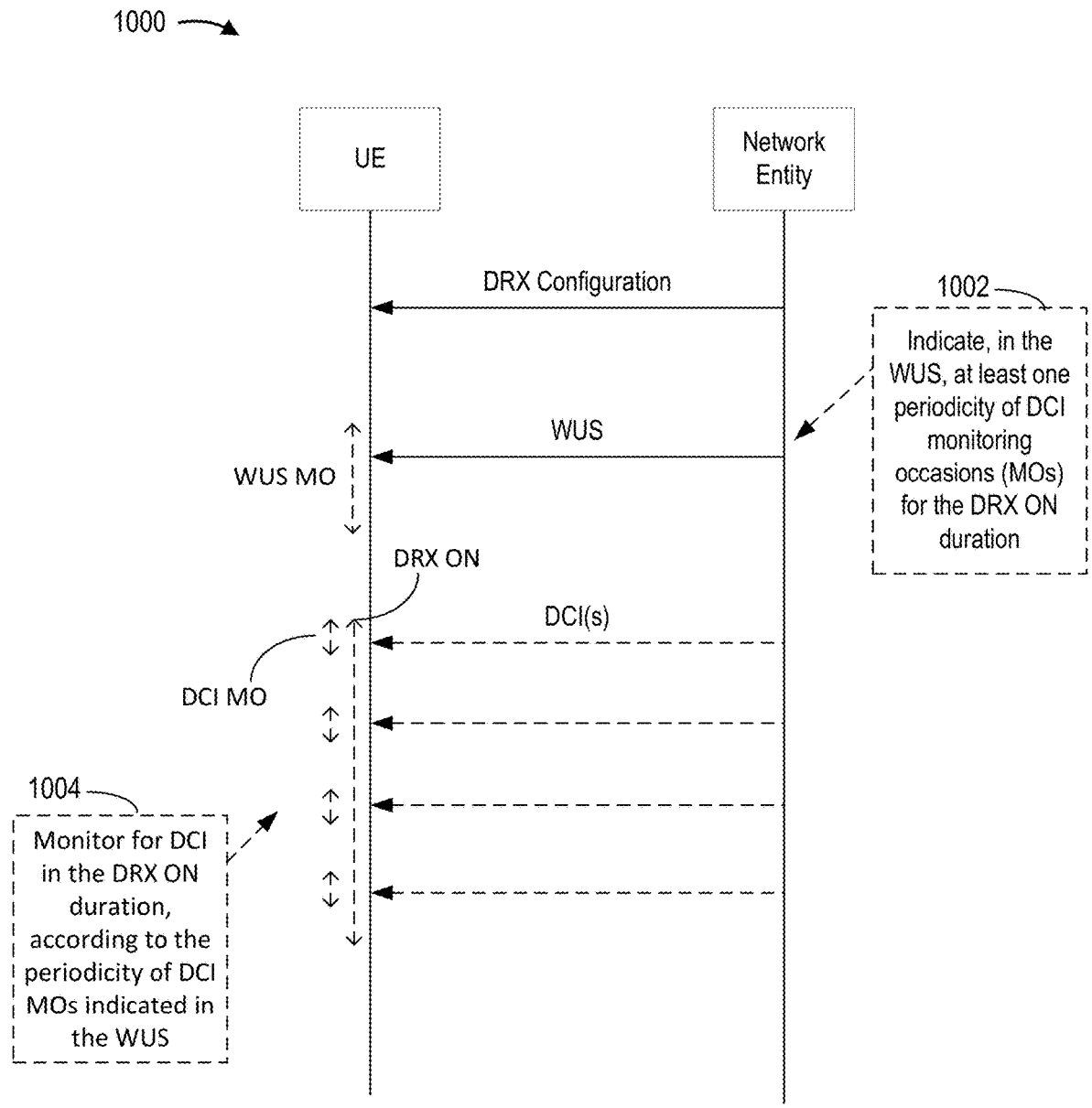
FIG. 10 is a call flow diagram illustrating an example of indicating distribution of downlink control information (DCI) MO periodicity via a WUS, in accordance with aspects of the present disclosure.

Techniques for dynamically signaling an indication of a distribution of DCI MOs for an upcoming On duration may be understood with reference to the call flow diagram 1000 of FIG. 10. In some aspects, the network entity depicted in FIG. 10 may be an example of the BS 102 depicted and described with respect to FIGS. 1 and 3 or a disaggregated base station depicted and described with respect to FIG. 2. Similarly, the UE depicted in FIG. 10 may be an example of UE 104 depicted and described with respect to FIGS. 1 and 3.

As illustrated, the network entity may configure the UE for DRX operation. The network entity may transmit a signal indicating the UE should be awake for an upcoming DRX ON duration. The UE may then monitor for DCI in the DRX ON duration, according to an indication in the signal of at least one periodicity of DCI monitoring occasions (MOs) for the DRX ON duration.

For example, the network entity may transmit a WUS, within a WUS MO monitored by the UE. As shown at 1002, the network entity may indicate, in the WUS, at least one periodicity of DCI MOs for the DRX ON duration. As shown at 1004, the UE may then monitor for DCI in the DRX ON duration, according to the periodicity of DCI MOs indicated in the WUS.

In some cases, a DCI carrying the WUS may indicate one of multiple DCI MO distributions (e.g., with different periodicities) for the UE to monitor in an upcoming On duration.

Figure 11:
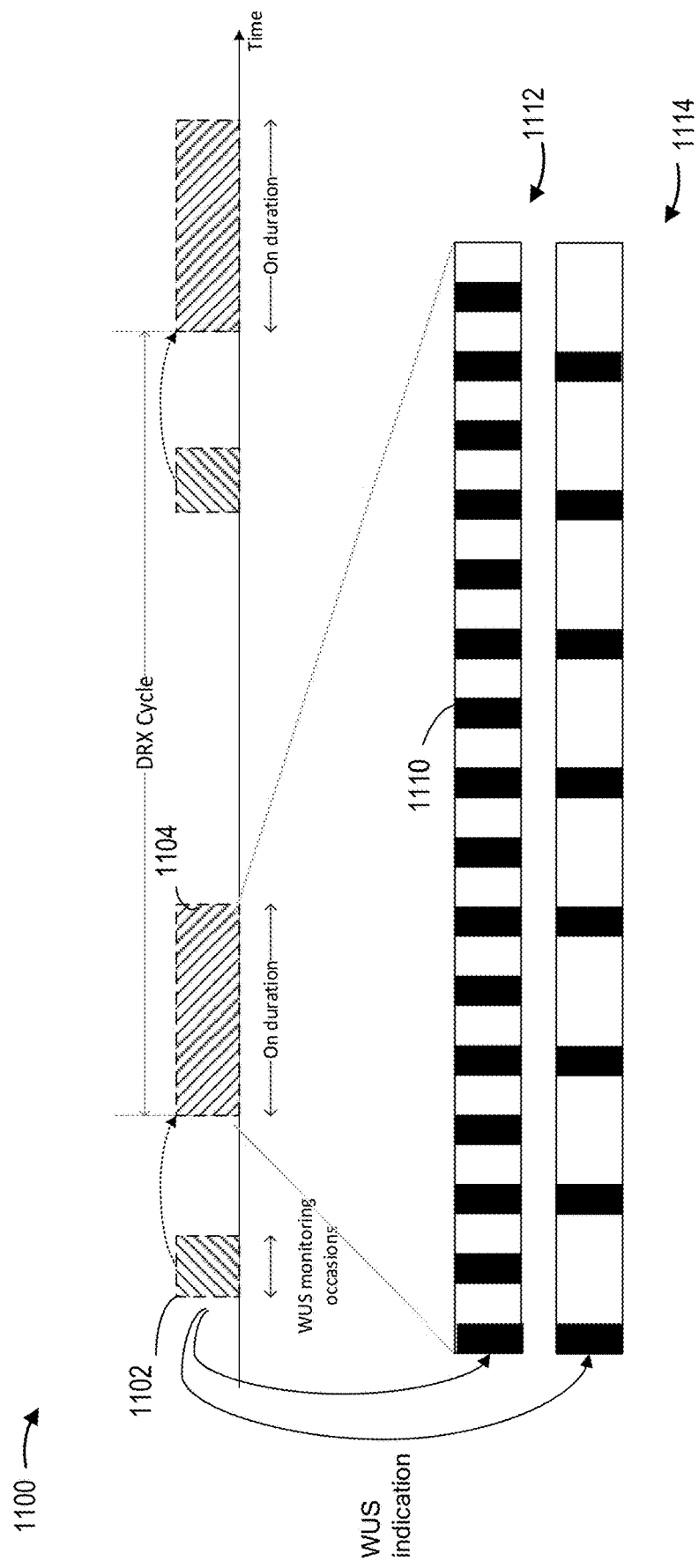
FIG. 11 depicts an example of WUS carrying an indication DCI MOs in an On duration, in accordance with aspects of the present disclosure.

For example, as illustrated in the diagram 1100 of FIG. 11, a WUS received in a WUS MO 1102 may indicate one of a first distribution 1112 DCI MOs 1110 with a first periodicity or a second distribution 1114 of DCI MOs with a second periodicity. In some cases, the UE may be configured with a plurality of DCI MO distributions, for example, via RRC signaling (e.g., of a DRX configuration).

In such cases, the DCI carrying the WUS may have one or more bits to indicate one of a plurality of DCI MO configurations. In some cases, the one or more bits may include one or more (previously) reserved bits in the DCI. In some cases, a DCI may have a field to indicate the dormancy behavior of one or more cells. If the number of dormant cells is less than the number of bits needed to indicate their dormancy behavior, one or more of the dormancy indication bits can be used for the DCI MO distribution (e.g., periodicity) indication.

In some cases, the network may group the bits dedicated for dormancy indication and allocate some of the (previously used dormancy indication bits) for the purpose of dynamic indicating the distribution of DCI MOs. For example, instead of 5 bits, where each bit indicates the dormancy behavior of one cell, one (or more) of the 5 bits can indicate the dormancy behavior of more than one cell (freeing up other bits for dynamic DCI MO indication). Under this option, the UE can be configured with cell grouping information to map the dormancy indication to the corresponding cells.

For dynamic DCI MO indication, the UE may be RRC configured with two or more MO and search space configurations, where the WUS can dynamically select from them. In some cases, the change in periodicity (distribution) of the MOs can be a UE specific field or a common field. Not all UEs may support dynamic indication of monitoring periodicity. Therefore, such support may be indicated by a UE, for example, as part of a UE capability report.

In some cases, a UE may be dynamically signaled an indication that there are at least first and second periodicities of the DCI MOs for different portions of the DRX ON duration.

Figure 12:
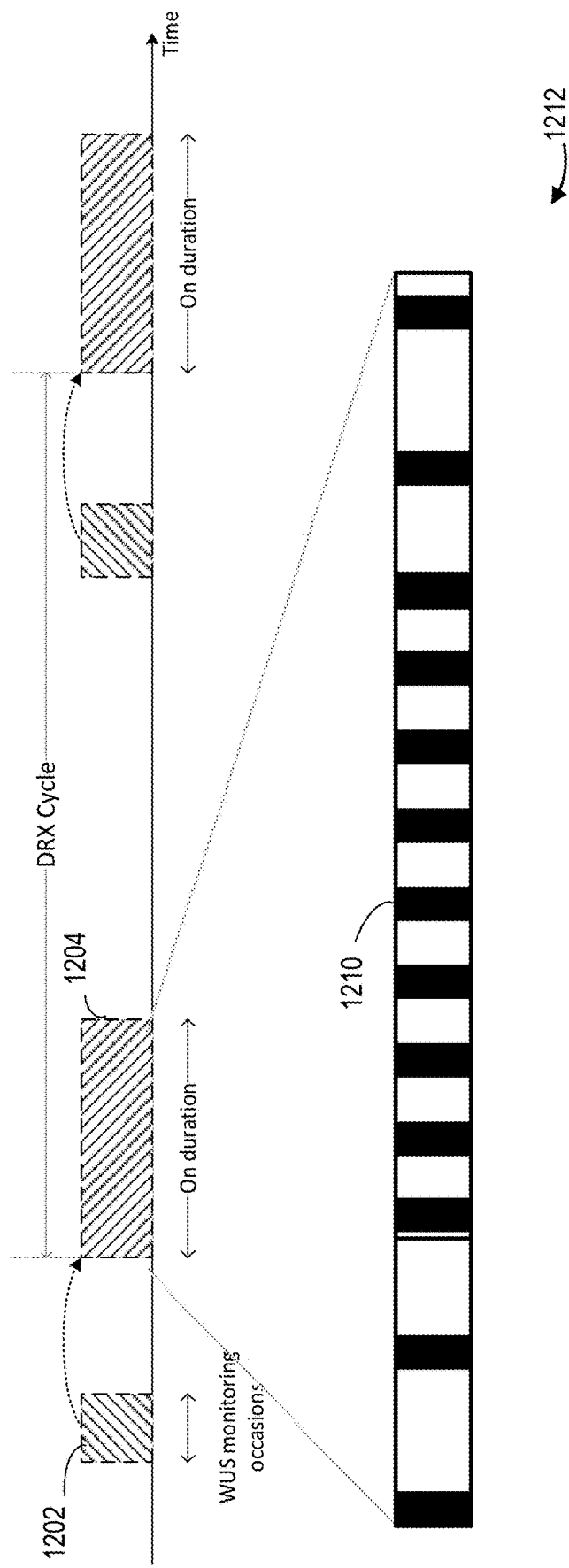
FIG. 12 depicts an example of WUS carrying an indication of a distribution of DCI MOs in an On duration, in accordance with aspects of the present disclosure.

For example, FIG. 12 shows an example MO distribution 1212 where the on duration 1204 is partitioned into multiple regions in which there is a different search space/MO configuration in each region. As the number of regions/partitions increase, the achieved distribution of MOs in the On duration may more accurately follow a specific distribution, albeit the configuration overhead may increase.

Figure 13:
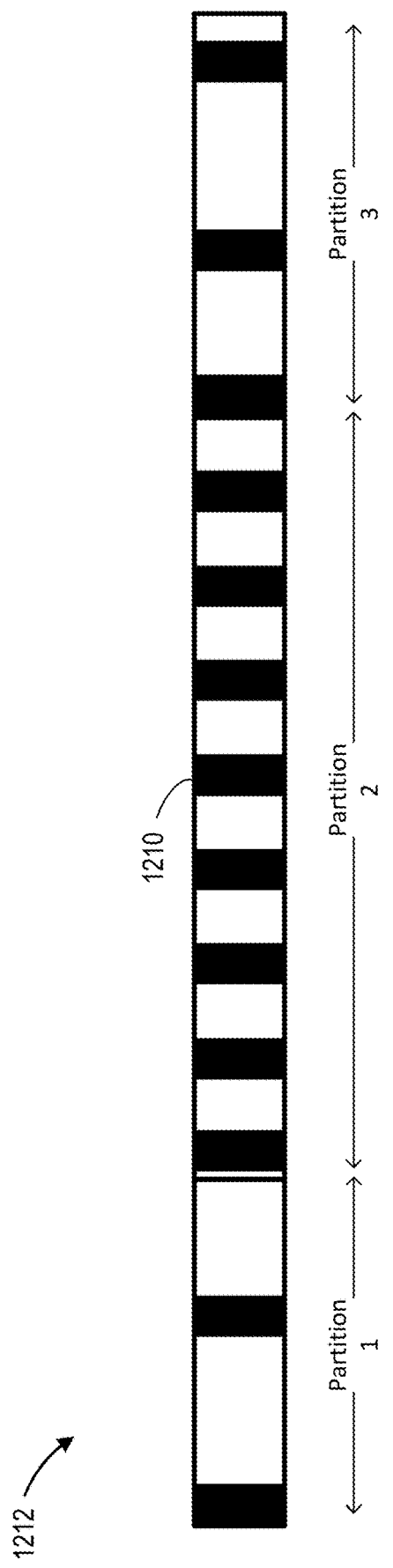
FIG. 13 depicts an example of how DCI MOs may be distributed in different partitions of an On duration, in accordance with aspects of the present disclosure.

FIG. 13 shows one example of how the distribution 1212 may have different periodicities of DCI MOs 1210 in different partitions of the On duration, giving more control on different subintervals. DCI MOs may occur less frequently in a first partition (Partition 1). Assuming more data is anticipated to arrive in the middle (Partition 2), the frequency of DCI MOs may be increased. The DCI MOs may be reduced, to manage monitoring efficiency, in a last partition (Partition 3).

Figure 14:
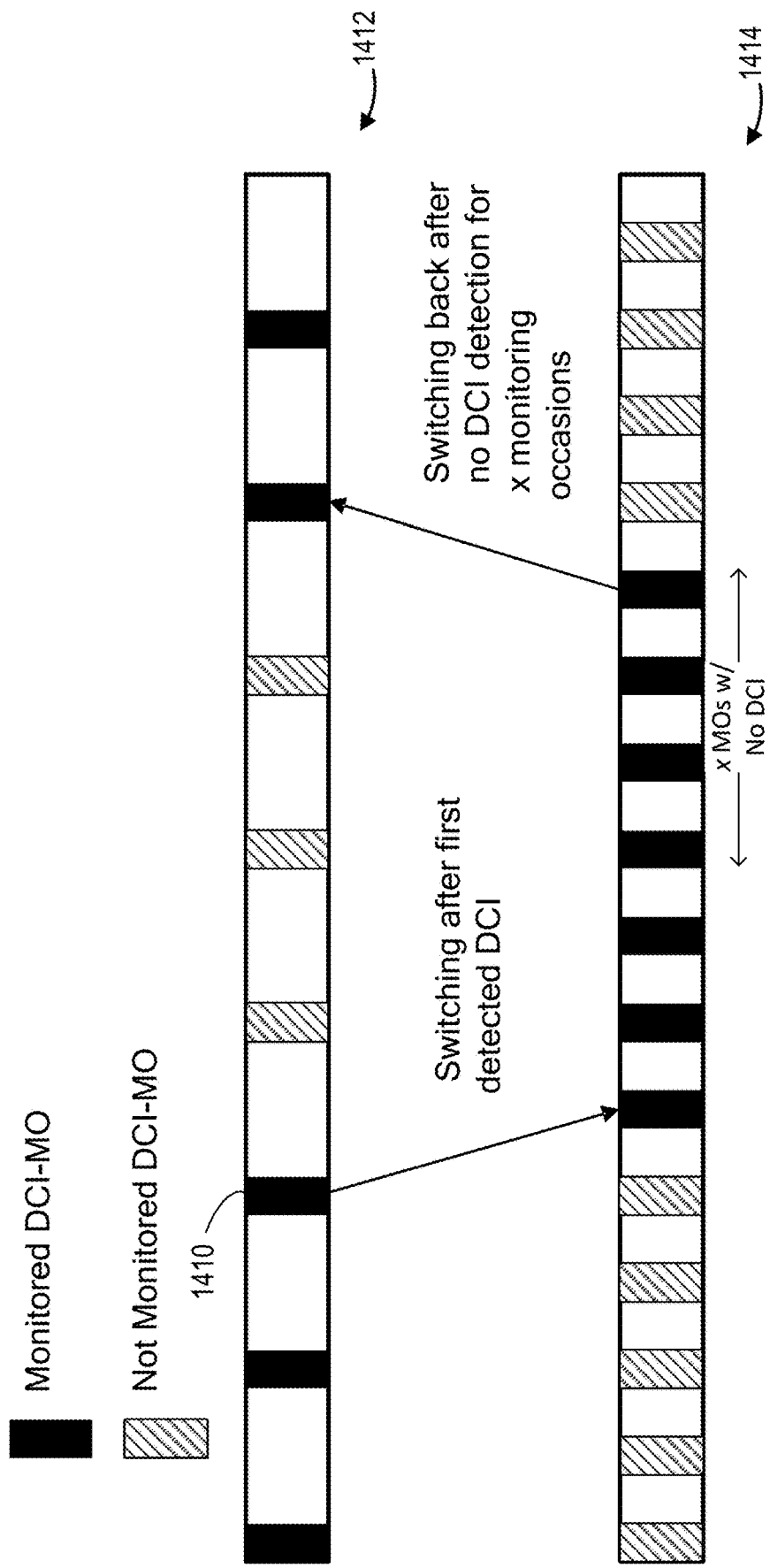
FIG. 14 depicts an example of how a UE may switch between DCI MO configurations within an On duration, in accordance with aspects of the present disclosure.

In some cases, as shown in FIG. 14, a UE may switch (within the DRX ON duration), from a first periodicity to a second periodicity based on one or more criteria. For example, the UE may switch from a first distribution 1412 with a first periodicity (with less frequent DCI MOs) to a second distribution 1414 with a second periodicity (with more frequent DCI MOs) after the first detected DCI. The UE may switch back to the first distribution 1412, for example, after not detecting any DCI for x monitoring occasions (e.g., where x=4 in the illustrated example). This option is useful since after the reception of the first DCI, the UE expects more data arrivals from the point of the first DCI detection.

By providing a mechanism to dynamically signal an indication of a distribution of DCI MOs in an upcoming On duration, aspects of the present disclosure allow DCI MO distribution to be adapted to fit data arrival priority. As a result, the techniques proposed herein may result in increased UE power savings while maintaining data rate.

Example Operations of a User Equipment

Figure 15:
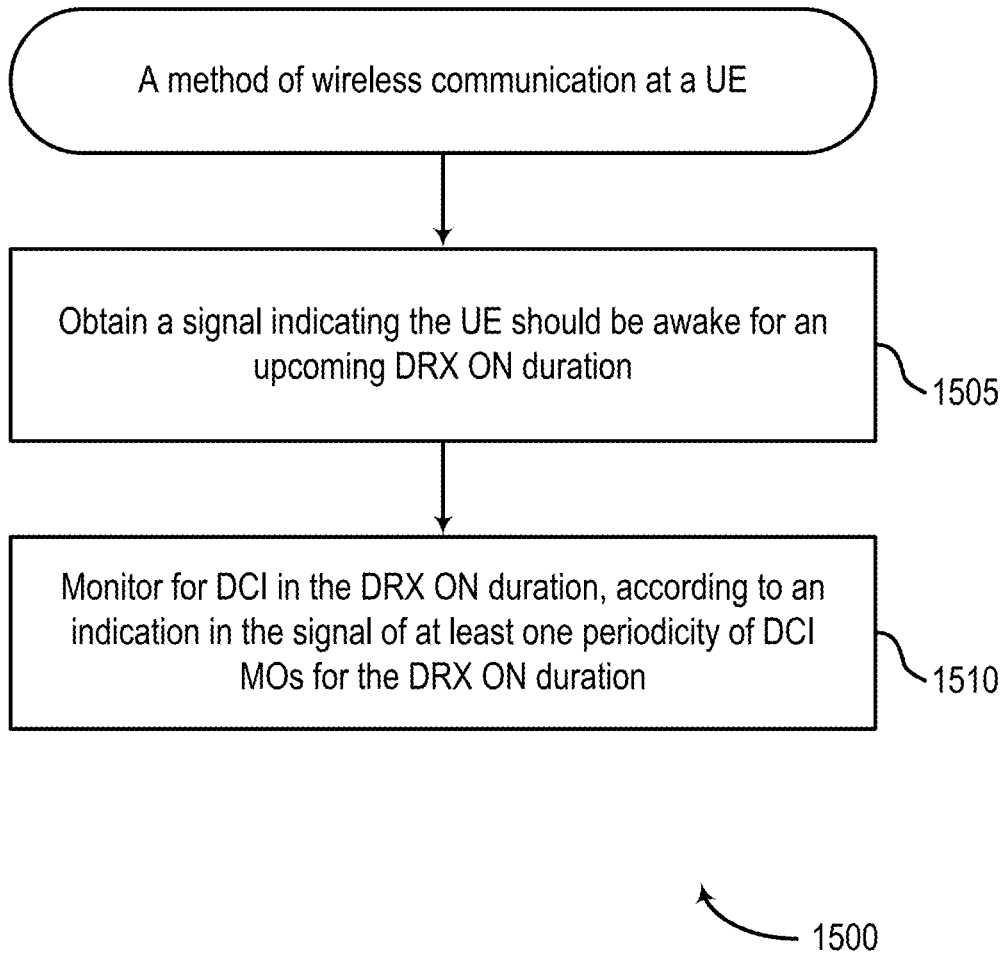
FIG. 15 depicts a method for wireless communications.

FIG. 15 shows an example of a method 1500 of wireless communication at a UE, such as a UE 104 of FIGS. 1 and 3.

Method 1500 begins at step 1505 with obtaining a signal indicating the UE should be awake for an upcoming DRX ON duration. In some cases, the operations of this step refer to, or may be performed by, circuitry for obtaining and/or code for obtaining as described with reference to FIG. 17.

Method 1500 then proceeds to step 1510 with monitoring for DCI in the DRX ON duration, according to an indication in the signal of at least one periodicity of DCI MOs for the DRX ON duration. In some cases, the operations of this step refer to, or may be performed by, circuitry for monitoring and/or code for monitoring as described with reference to FIG. 17.

In some aspects, the signal comprises a WUS.

In some aspects, the at least one periodicity of DCI MOs is indicated in the signal as being associated with the DRX ON duration.

In some aspects, the at least one periodicity of the DCI MOs is indicated by one or more bits in the signal.

In some aspects, the one or more bits comprise a first set of bits of a field used to indicate dormancy behavior of one or more cells.

In some aspects, the field used to indicate dormancy behavior of one or more cells comprises a second set of one or more bits that indicate the dormancy behavior of multiple cells.

In some aspects, the method 1500 further includes obtaining signaling configuring the UE with at least two periodicities of the DCI MOs, wherein the indication in the WUS selects one of the at least two periodicities. In some cases, the operations of this step refer to, or may be performed by, circuitry for obtaining and/or code for obtaining as described with reference to FIG. 17.

In some aspects, the indication in the WUS is conveyed via a UE specific field.

In some aspects, the method 1500 further includes outputting, for transmission, signaling indicating a capability of the UE to support dynamic indication of periodicity of the DCI MOs. In some cases, the operations of this step refer to, or may be performed by, circuitry for outputting and/or code for outputting as described with reference to FIG. 17.

In some aspects, the at least one periodicity comprises at least first and second periodicities of the DCI MOs for different portions of the DRX ON duration.

In some aspects, the DRX ON duration is partitioned into multiple portions in which there are different DCI MO configurations with the at least first and second periodicities of the DCI MOs.

In some aspects, the method 1500 further includes switching, within the DRX ON duration, from the first periodicity to the second periodicity based on one or more criteria. In some cases, the operations of this step refer to, or may be performed by, circuitry for switching and/or code for switching as described with reference to FIG. 17.

In some aspects, the one or more criteria comprise obtaining a DCI prompting the switching.

In some aspects, the second periodicity: has less frequent DCI MOs than the first periodicity; and is determined based on at least one of the first periodicity and a sub sampling factor.

In some aspects, the method 1500 further includes obtaining one or more search space configurations configuring the UE with the first and second periodicities. In some cases, the operations of this step refer to, or may be performed by, circuitry for obtaining and/or code for obtaining as described with reference to FIG. 17.

In some aspects, the one or more search space configurations comprise separate sets of configurations or a single configuration.

Figure 17:
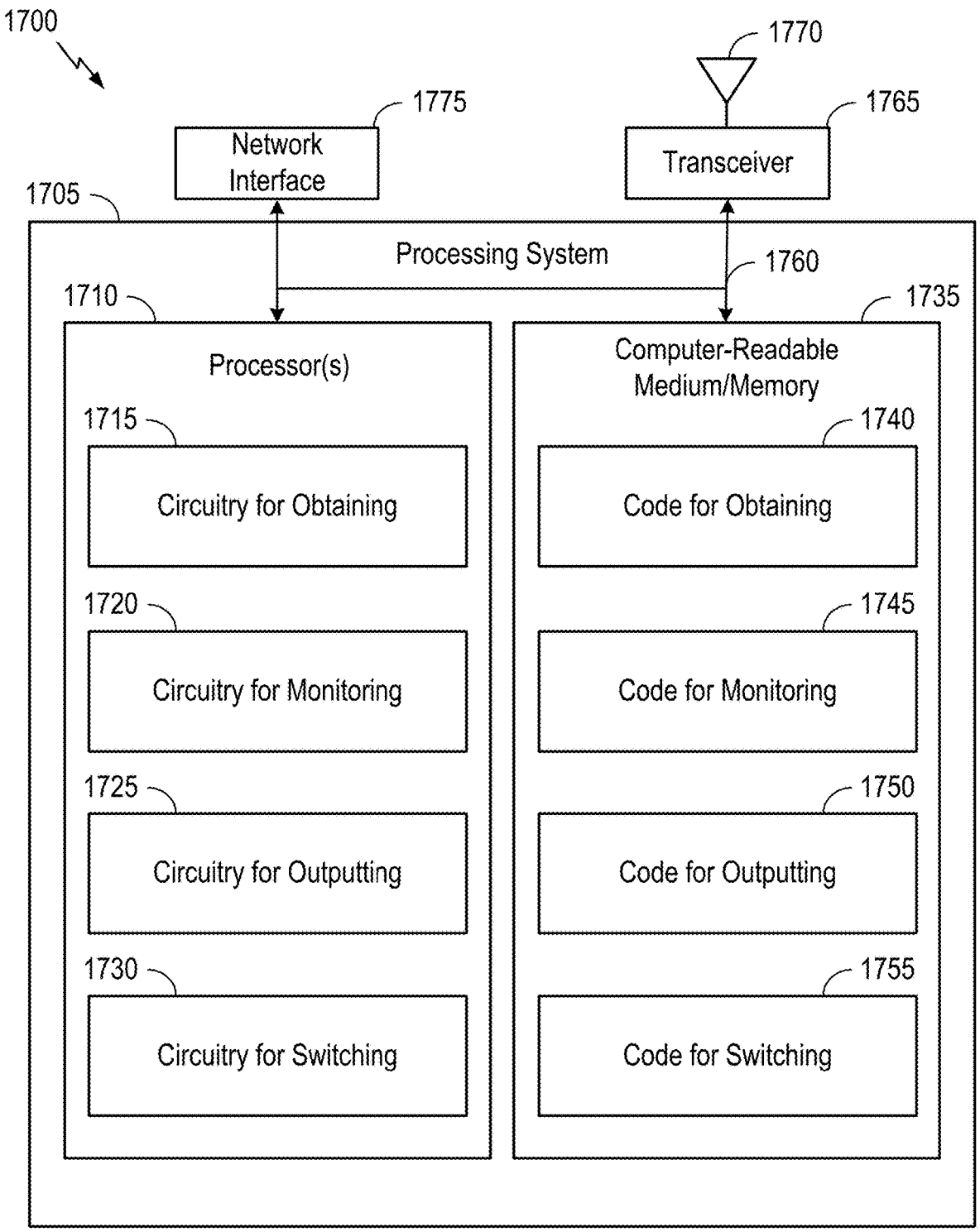
FIG. 17 depicts aspects of an example communications device.

In one aspect, method 1500, or any aspect related to it, may be performed by an apparatus, such as communications device 1700 of FIG. 17, which includes various components operable, configured, or adapted to perform the method 1500. Communications device 1700 is described below in further detail.

Note that FIG. 15 is just one example of a method, and other methods including fewer, additional, or alternative steps are possible consistent with this disclosure.

Example Operations of a Network Entity

Figure 16:
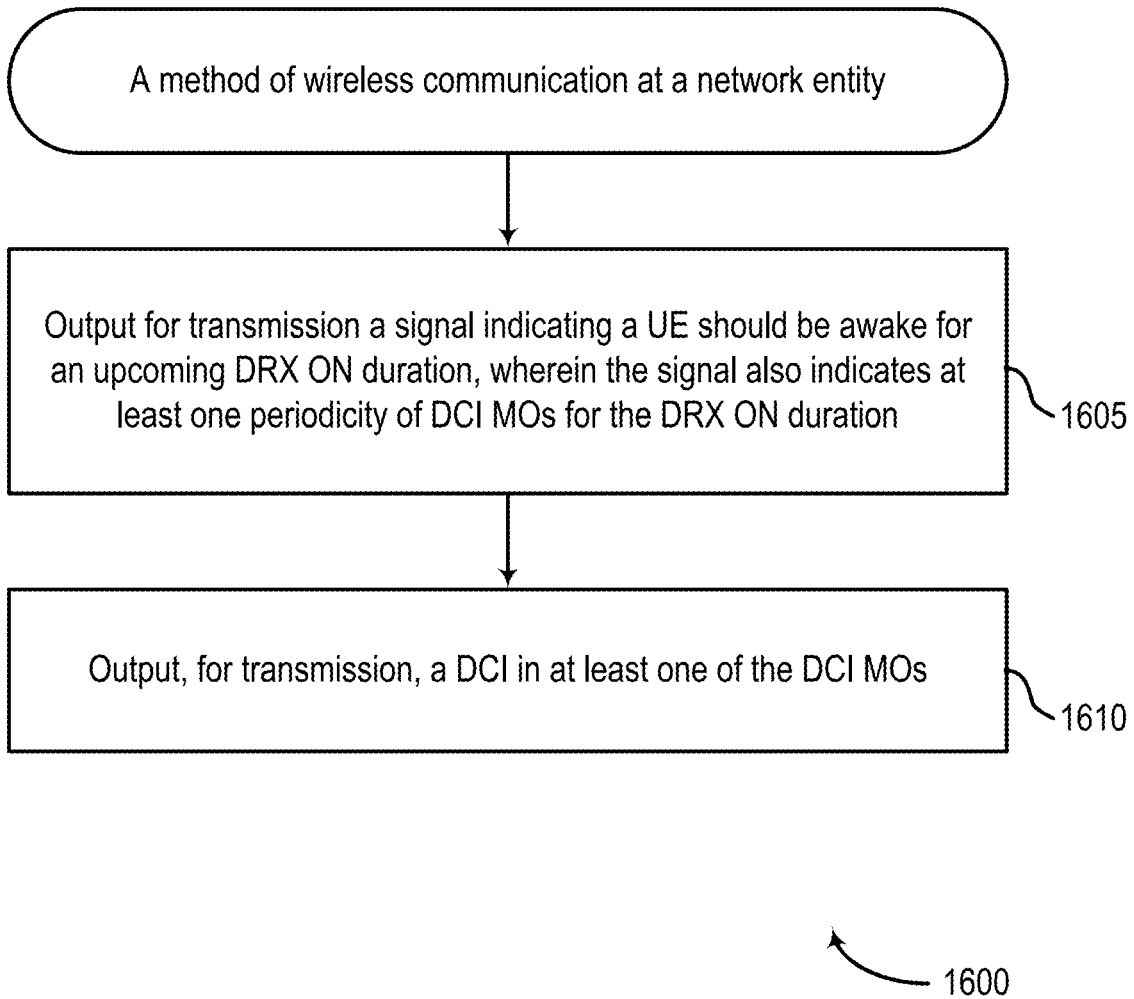
FIG. 16 depicts a method for wireless communications.

FIG. 16 shows an example of a method 1600 of wireless communication at a network entity, such as a BS 102 of FIGS. 1 and 3, or a disaggregated base station as discussed with respect to FIG. 2.

Method 1600 begins at step 1605 with outputting for transmission a signal indicating a UE should be awake for an upcoming DRX ON duration, wherein the signal also indicates at least one periodicity of DCI MOs for the DRX ON duration. In some cases, the operations of this step refer to, or may be performed by, circuitry for outputting and/or code for outputting as described with reference to FIG. 17.

Method 1600 then proceeds to step 1610 with outputting, for transmission, a DCI in at least one of the DCI MOs. In some cases, the operations of this step refer to, or may be performed by, circuitry for outputting and/or code for outputting as described with reference to FIG. 17.

In some aspects, the signal comprises a WUS.

In some aspects, the at least one periodicity of DCI MOs is indicated in the signal as being associated with the DRX ON duration.

In some aspects, the at least one periodicity of the DCI MOs is indicated by one or more bits in the signal.

In some aspects, the one or more bits comprise a first set of bits of a field used to indicate dormancy behavior of one or more cells.

In some aspects, the field used to indicate dormancy behavior of one or more cells comprises a second set of one or more bits that indicate the dormancy behavior of multiple cells.

In some aspects, the method 1600 further includes outputting, for transmission, signaling configuring the UE with at least two periodicities of the DCI MOs, wherein the indication in the WUS selects one of the at least two periodicities. In some cases, the operations of this step refer to, or may be performed by, circuitry for outputting and/or code for outputting as described with reference to FIG. 17.

In some aspects, the indication in the WUS is conveyed via a UE specific field.

In some aspects, the method 1600 further includes obtaining, from the UE, signaling indicating a capability of the UE to support dynamic indication of periodicity of the DCI MOs. In some cases, the operations of this step refer to, or may be performed by, circuitry for obtaining and/or code for obtaining as described with reference to FIG. 17.

In some aspects, the at least one periodicity comprises at least first and second periodicities of the DCI MOs for different portions of the DRX ON duration.

In some aspects, the DRX ON duration is partitioned into multiple portions in which there are different DCI MO configurations with the at least first and second periodicities of the DCI MOs.

In some aspects, the method 1600 further includes switching, within the DRX ON duration, from the first periodicity to the second periodicity based on one or more criteria. In some cases, the operations of this step refer to, or may be performed by, circuitry for switching and/or code for switching as described with reference to FIG. 17.

In some aspects, the method 1600 further includes outputting, for transmission, a DCI in at least one DCI MO according to the second periodicity. In some cases, the operations of this step refer to, or may be performed by, circuitry for outputting and/or code for outputting as described with reference to FIG. 17.

In some aspects, the one or more criteria comprise outputting, for transmission, a DCI prompting the switching.

In some aspects, the second periodicity: has less frequent DCI MOs than the first periodicity; and is determined based on at least one of the first periodicity and a sub sampling factor.

In some aspects, the method 1600 further includes outputting, for transmission, one or more search space configurations configuring the UE with the first and second periodicities. In some cases, the operations of this step refer to, or may be performed by, circuitry for outputting and/or code for outputting as described with reference to FIG. 17.

In some aspects, the one or more search space configurations comprise separate sets of configurations or a single configuration.

In one aspect, method 1600, or any aspect related to it, may be performed by an apparatus, such as communications device 1700 of FIG. 17, which includes various components operable, configured, or adapted to perform the method 1600. Communications device 1700 is described below in further detail.

Note that FIG. 16 is just one example of a method, and other methods including fewer, additional, or alternative steps are possible consistent with this disclosure.

Example Communications Device

FIG. 17 depicts aspects of an example communications device 1700. In some aspects, communications device 1700 is a user equipment, such as a UE 104 described above with respect to FIGS. 1 and 3. In some aspects, communications device 1700 is a network entity, such as a BS 102 of FIGS. 1 and 3, or a disaggregated base station as discussed with respect to FIG. 2.

The communications device 1700 includes a processing system 1705 coupled to the transceiver 1765 (e.g., a transmitter and/or a receiver). In some aspects (e.g., when communications device 1700 is a network entity), processing system 1705 may be coupled to a network interface 1775 that is configured to obtain and send signals for the communications device 1700 via communication link(s), such as a backhaul link, midhaul link, and/or fronthaul link as described herein, such as with respect to FIG. 2. The transceiver 1765 is configured to transmit and receive signals for the communications device 1700 via the antenna 1770, such as the various signals as described herein. The processing system 1705 may be configured to perform processing functions for the communications device 1700, including processing signals received and/or to be transmitted by the communications device 1700.

The processing system 1705 includes one or more processors 1710. In various aspects, the one or more processors 1710 may be representative of one or more of receive processor 358, transmit processor 364, TX MIMO processor 366, and/or controller/processor 380, as described with respect to FIG. 3. In various aspects, one or more processors 1710 may be representative of one or more of receive processor 338, transmit processor 320, TX MIMO processor 330, and/or controller/processor 340, as described with respect to FIG. 3. The one or more processors 1710 are coupled to a computer-readable medium/memory 1735 via a bus 1760. In certain aspects, the computer-readable medium/memory 1735 is configured to store instructions (e.g., computer-executable code) that when executed by the one or more processors 1710, cause the one or more processors 1710 to perform: the method 1500 described with respect to FIG. 15, or any aspect related to it; and/or the method 1600 described with respect to FIG. 16, or any aspect related to it. Note that reference to a processor performing a function of communications device 1700 may include one or more processors 1710 performing that function of communications device 1700.

In the depicted example, computer-readable medium/memory 1735 stores code (e.g., executable instructions), such as code for obtaining 1740, code for monitoring 1745, code for outputting 1750, and code for switching 1755. Processing of the code for obtaining 1740, code for monitoring 1745, code for outputting 1750, and code for switching 1755 may cause the communications device 1700 to perform: the method 1500 described with respect to FIG. 15, or any aspect related to it; and/or the method 1600 described with respect to FIG. 16, or any aspect related to it.

The one or more processors 1710 include circuitry configured to implement (e.g., execute) the code stored in the computer-readable medium/memory 1735, including circuitry such as circuitry for obtaining 1715, circuitry for monitoring 1720, circuitry for outputting 1725, and circuitry for switching 1730. Processing with circuitry for obtaining 1715, circuitry for monitoring 1720, circuitry for outputting 1725, and circuitry for switching 1730 may cause the communications device 1700 to perform: the method 1500 described with respect to FIG. 15, or any aspect related to it; and/or the method 1600 described with respect to FIG. 16, or any aspect related to it.

Various components of the communications device 1700 may provide means for performing: the method 1500 described with respect to FIG. 15, or any aspect related to it; and/or the method 1600 described with respect to FIG. 16, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1765 and the antenna 1770 of the communications device 1700 in FIG. 17. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1765 and the antenna 1770 of the communications device 1700 in FIG. 17. In some aspects, means for obtaining, means for monitoring, and/or means for switching may include one or more of the processors illustrated in FIG. 2

Example Clauses

Implementation examples are described in the following numbered clauses:

Clause 1: A method of wireless communication at a UE, comprising: obtaining a signal indicating the UE should be awake for an upcoming DRX ON duration; and monitoring for DCI in the DRX ON duration, according to an indication in the signal of at least one periodicity of DCI MOs for the DRX ON duration.

Clause 2: The method of Clause 1, wherein the signal comprises a WUS.

Clause 3: The method of any one of Clauses 1 and 2, wherein the at least one periodicity of DCI MOs is indicated in the signal as being associated with the DRX ON duration.

Clause 4: The method of any one of Clauses 1-3, wherein the at least one periodicity of the DCI MOs is indicated by one or more bits in the signal.

Clause 5: The method of Clause 4, wherein the one or more bits comprise a first set of bits of a field used to indicate dormancy behavior of one or more cells.

Clause 6: The method of Clause 5, wherein the field used to indicate dormancy behavior of one or more cells comprises a second set of one or more bits that indicate the dormancy behavior of multiple cells.

Clause 7: The method of any one of Clauses 1-6, further comprising: obtaining signaling configuring the UE with at least two periodicities of the DCI MOs; and selecting one of the at least two periodicities based on the indication in the signal.

Clause 8: The method of any one of Clauses 1-7, wherein the indication in the WUS is conveyed via a UE specific field.

Clause 9: The method of any one of Clauses 1-8, further comprising: outputting, for transmission, signaling indicating a capability of the UE to support dynamic indication of periodicity of the DCI MOs.

Clause 10: The method of any one of Clauses 1-9, wherein the at least one periodicity comprises at least first and second periodicities of the DCI MOs for different portions of the DRX ON duration.

Clause 11: The method of Clause 10, wherein: the DRX ON duration is partitioned into multiple portions in which there are different DCI MO configurations with the at least first and second periodicities of the DCI MOs.

Clause 12: The method of Clause 10, further comprising: switching, within the DRX ON duration, from the first periodicity to the second periodicity based on one or more criteria.

Clause 13: The method of Clause 12, wherein the one or more criteria comprise obtaining a DCI prompting the switching.

Clause 14: The method of Clause 10, wherein the second periodicity: has less frequent DCI MOs than the first periodicity; and is based on the first periodicity and a subsampling factor.

Clause 15: The method of Clause 10, further comprising: obtaining one or more search space configurations configuring the UE with the first and second periodicities.

Clause 16: The method of Clause 15, wherein the one or more search space configurations comprise separate sets of configurations or a single configuration.

Clause 17: A method of wireless communication at a network entity, comprising: outputting for transmission a signal indicating a UE should be awake for an upcoming DRX ON duration, wherein the signal also indicates at least one periodicity of DCI MOs for the DRX ON duration; and outputting, for transmission, a DCI in at least one of the DCI MOs.

Clause 18: The method of Clause 17, wherein the signal comprises a WUS.

Clause 19: The method of any one of Clauses 17 and 18, wherein the at least one periodicity of DCI MOs is indicated in the signal as being associated with the DRX ON duration.

Clause 20: The method of any one of Clauses 17-19, wherein the at least one periodicity of the DCI MOs is indicated by one or more bits in the signal.

Clause 21: The method of Clause 20, wherein the one or more bits comprise a first set of bits of a field used to indicate dormancy behavior of one or more cells.

Clause 22: The method of Clause 21, wherein the field used to indicate dormancy behavior of one or more cells comprises a second set of one or more bits that indicate the dormancy behavior of multiple cells.

Clause 23: The method of any one of Clauses 17-22, further comprising: outputting, for transmission, signaling configuring the UE with at least two periodicities of the DCI MOs; and selecting one of the at least two periodicities via the indication in the signal.

Clause 24: The method of any one of Clauses 17-23, wherein the indication in the signal is conveyed via a UE specific field.

Clause 25: The method of any one of Clauses 17-24, further comprising: obtaining, from the UE, signaling indicating a capability of the UE to support dynamic indication of periodicity of the DCI MOs.

Clause 26: The method of any one of Clauses 17-25, wherein the at least one periodicity comprises at least first and second periodicities of the DCI MOs for different portions of the DRX ON duration.

Clause 27: The method of Clause 26, wherein: the DRX ON duration is partitioned into multiple portions in which there are different DCI MO configurations with the at least first and second periodicities of the DCI MOs.

Clause 28: The method of Clause 26, further comprising: switching, within the DRX ON duration, from the first periodicity to the second periodicity based on one or more criteria; and outputting, for transmission, a DCI in at least one DCI MO according to the second periodicity.

Clause 29: The method of Clause 28, wherein the one or more criteria comprise outputting, for transmission, a DCI prompting the switching.

Clause 30: The method of Clause 26, wherein the second periodicity: has less frequent DCI MOs than the first periodicity; and is based on the first periodicity and a subsampling factor.

Clause 31: The method of Clause 26, further comprising: outputting, for transmission, one or more search space configurations configuring the UE with the first and second periodicities.

Clause 32: The method of Clause 31, wherein the one or more search space configurations comprise separate sets of configurations or a single configuration.

Clause 33: An apparatus, comprising: a memory comprising executable instructions; and a processor configured to execute the executable instructions and cause the apparatus to perform a method in accordance with any one of Clauses 1-32.

Clause 34: An apparatus, comprising means for performing a method in accordance with any one of Clauses 1-32.

Clause 35: A non-transitory computer-readable medium comprising executable instructions that, when executed by a processor of an apparatus, cause the apparatus to perform a method in accordance with any one of Clauses 1-32.

Clause 36: A computer program product embodied on a computer-readable storage medium comprising code for performing a method in accordance with any one of Clauses 1-32.

Clause 37: A user equipment (UE), comprising: at least one transceiver; a memory comprising instructions; and one or more processors configured to execute the instructions and cause the UE to perform a method in accordance with any one of Clauses 1-16, wherein the at least one transceiver is configured to receive the signal.

Clause 38: A network entity, comprising: at least one transceiver; a memory comprising instructions; and one or more processors configured to execute the instructions and cause the network entity to perform a method in accordance with any one of Clauses 17-32, wherein the at least one transceiver is configured to transmit the signal.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
   at least one memory comprising processor-executable instructions; and
   one or more processors configured to execute the processor-executable instructions to cause the apparatus to:
   output, for transmission, first signaling indicating a capability of the apparatus to support dynamic indication of periodicity of downlink control information (DCI) monitoring occasions (MOs);
   obtain second signaling indicating the apparatus should be awake for an upcoming discontinuous reception (DRX) ON duration, wherein, based on the capability of the apparatus, the second signaling includes an indication of at least one periodicity of DCI MOs for the DRX ON duration; and
   monitor for DCI in the DRX ON duration, according to the indication of the at least one periodicity of the DCI MOs.

2. The apparatus of claim 1, wherein the second signaling comprises a wake up signal (WUS).

3. The apparatus of claim 1, wherein the at least one periodicity of DCI MOs is indicated in the second signaling as being associated with the DRX ON duration.

4. The apparatus of claim 1, wherein the at least one periodicity of the DCI MOs is indicated by one or more bits in the second signaling.

5. The apparatus of claim 4, wherein the one or more bits comprise a first set of bits of a field used to indicate dormancy behavior of one or more cells.

6. The apparatus of claim 5, wherein the field used to indicate a dormancy behavior of one or more cells comprises a second set of one or more bits that indicate the dormancy behavior of the one or more cells.

7. The apparatus of claim 1, wherein the one or more processors are further configured to cause the apparatus to:
   obtain signaling configuring the apparatus with at least two periodicities of the DCI MOs; and
   select one of the at least two periodicities based on the indication in the second signaling.

8. The apparatus of claim 1, wherein the indication in the second signaling is conveyed via a user equipment (UE) specific field.

9. The apparatus of claim 1, wherein the at least one periodicity comprises at least first and second periodicities of the DCI MOs for different portions of the DRX ON duration.

10. The apparatus of claim 9, wherein:
the DRX ON duration is partitioned into multiple portions in which there are different DCI MO configurations with the at least first and second periodicities of the DCI MOs.

11. The apparatus of claim 9, wherein the one or more processors are further configured to cause the apparatus to:
switch, within the DRX ON duration, from the first periodicity to the second periodicity based on one or more criteria.

12. The apparatus of claim 11, wherein the one or more criteria comprise obtaining a DCI prompting the switching.

13. The apparatus of claim 9, wherein the second periodicity:
has less frequent DCI MOs than the first periodicity; and
is based on the first periodicity and a subsampling factor.

14. The apparatus of claim 9, wherein the one or more processors are further configured to cause the apparatus to:
obtain one or more search space configurations configuring the apparatus with the first and second periodicities.

15. The apparatus of claim 14, wherein the one or more search space configurations comprise:
separate sets of configurations or a single configuration.

16. An apparatus for wireless communication, comprising:
at least one memory comprising processor-executable instructions; and
one or more processors configured to execute the processor-executable instructions to cause the apparatus to:
obtain, from a user equipment (UE), first signaling indicating a capability of the UE to support dynamic indication of periodicity of downlink control information (DCI) monitoring occasions (MOs);
output for transmission second signaling indicating the UE should be awake for an upcoming discontinuous reception (DRX) ON duration, wherein, based on the capability of the UE, the second signaling also indicates at least one periodicity of the DCI MOs for the DRX ON duration; and
output, for transmission, a DCI in at least one of the DCI MOs.

17. The apparatus of claim 16, wherein at least one of:
the second signaling comprises a wake up signal (WUS);
the at least one periodicity of DCI MOs is indicated in the second signaling as being associated with the DRX ON duration; or
the at least one periodicity of the DCI MOs is indicated by one or more bits in the second signaling.

18. The apparatus of claim 17, wherein the one or more bits comprise a first set of bits of a field used to indicate dormancy behavior of one or more cells.

19. The apparatus of claim 18, wherein the field used to indicate a dormancy behavior of one or more cells comprises a second set of one or more bits that indicate the dormancy behavior of the one or more cells.

20. The apparatus of claim 16, wherein the one or more processors are further configured to cause the apparatus to at least one of:
output, for transmission, signaling configuring the UE with at least two periodicities of the DCI MOs and selecting one of the at least two periodicities via the indication in the second signaling.

21. The apparatus of claim 16, wherein the indication in the second signaling is conveyed via a UE specific field.

22. The apparatus of claim 16, wherein the at least one periodicity comprises at least first and second periodicities of the DCI MOs for different portions of the DRX ON duration.

23. The apparatus of claim 22, wherein:
the DRX ON duration is partitioned into multiple portions in which there are different DCI MO configurations with the at least first and second periodicities of the DCI MOs.

24. The apparatus of claim 22, wherein the one or more processors are further configured to cause the apparatus to:
switch, within the DRX ON duration, from the first periodicity to the second periodicity based on one or more criteria; and
output, for transmission, a DCI in at least one DCI MO according to the second periodicity.

25. The apparatus of claim 24, wherein the one or more criteria comprise outputting, for transmission, a DCI prompting the switching.

26. The apparatus of claim 22, wherein the second periodicity:
has less frequent DCI MOs than the first periodicity; and
is based on the first periodicity and a subsampling factor.

27. The apparatus of claim 22, wherein the one or more processors are further configured to cause the apparatus to:
output, for transmission, one or more search space configurations configuring the UE with the first and second periodicities, wherein the one or more search space configurations comprise separate sets of configurations or a single configuration.

28. The apparatus of claim 16, further comprising at least one transceiver, wherein the at least one transceiver is configured to transmit the second signaling and the apparatus is configured as a network entity.

29. A user equipment (UE), comprising:
at least one transceiver;
at least one memory comprising processor-executable instructions; and
one or more processors configured to execute the processor-executable instructions to cause the UE to:
transmit, via the at least one transceiver, first signaling indicating a capability of the UE to support dynamic indication of periodicity of downlink control information (DCI) monitoring occasions (MOs);
receive second signaling, via the at least one transceiver, indicating the UE should be awake for an upcoming discontinuous reception (DRX) ON duration, wherein, based on the capability of the UE, the second signaling includes an indication of at least one periodicity of the DCI MOs for the DRX ON duration; and
monitor DCI in the DRX ON duration, according to the indication of the at least one periodicity of the DCI MOs.

* * * * *